United States Patent [19]

Shimoni

[11] Patent Number: 4,644,398
[45] Date of Patent: Feb. 17, 1987

[54] SUPERINTERLACING IMAGING SYSTEMS
[75] Inventor: Yair Shimoni, Jerusalem, Israel
[73] Assignee: Elscint, Ltd., Haifa, Israel
[21] Appl. No.: 551,698
[22] Filed: Nov. 14, 1983
[51] Int. Cl.[4] .............................................. H04N 7/01
[52] U.S. Cl. ...................................... 358/140; 358/111
[58] Field of Search ............... 358/133, 135, 136, 138, 358/260, 111, 112, 113, 140, 160; 364/414; 340/728, 720; 360/11.1

[56] References Cited

U.S. PATENT DOCUMENTS

| | | |
|---|---|---|
| 2,921,124 | 1/1960 | Graham ............................... 358/138 |
| 3,051,778 | 8/1962 | Graham ............................... 358/133 |
| 4,150,397 | 4/1979 | Russell ........................... 360/11.1 X |
| 4,163,257 | 7/1979 | White .................................. 358/133 |
| 4,193,092 | 3/1980 | Stoffel ................................. 358/133 |
| 4,396,952 | 8/1983 | Tisue et al. ......................... 358/133 |

Primary Examiner—Howard W. Britton
Assistant Examiner—Victor R. Kostak
Attorney, Agent, or Firm—Sandler & Greenblum

[57] ABSTRACT

An imaging system that acquires and stores every other line to be used in a display image and interpolates the stored lines to obtain the lines between the stored lines for display purposes.

30 Claims, 2 Drawing Figures

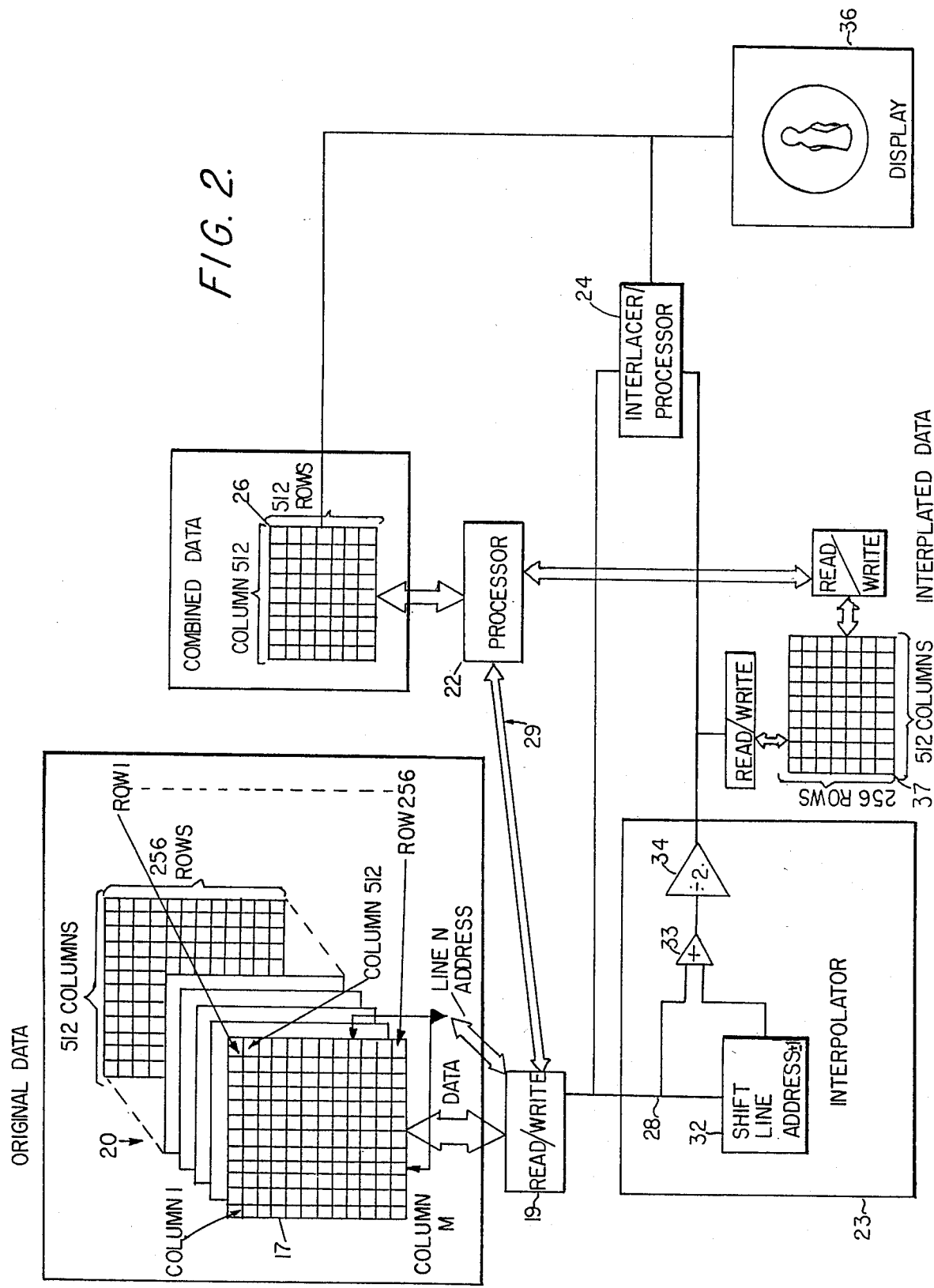

SUPERINTERLACING IMAGING SYSTEMS

FIELD OF THE INVENTION

This invention is concerned with imaging systems and more particularly to such systems used in acquiring images for diagnostic purposes.

BACKGROUND OF THE INVENTION

Electronically acquired images are usually stored in matrices comprised of rows and columns of data corresponding to the rows and columns of picture elements (pixels). The actual images as displayed on a cathode ray tube (CRT) for example, are in effect divided into rows and columns of rectangular pixels. The data in the rows and columns of the matrices corresponds to the data in each of the image rectangles.

For display purposes the values in the matrix or matrices are read out to the display monitor. In digital displays each pixel value in the matrix is transmitted to the corresponding place (by row and column) on the display monitor and the value is translated to a characteristic such as a light intensity and/or color. Many analog displays (CRTs) have a sweep mechanism that sweeps line after line. The sweep lines are made to correspond to the lines in the storage matrices. The pixel values in each line are sequentially transferred by the scanning mechanism at a rate that ensures that the translated pixel display (intensity and/or color) is spread across the image with each pixel value occupying an equal space. Thus the displayed images have M pixels displayed across each of the N lines.

The size of the memories or storage matrices are thus relatively large and represents significant components of any imaging systems. Thus any savings in the size and/or efficiency of such components will also be significant. A typical size of a matrix as defined is:

$$S = N \times M \times B$$

where:
N = the number of rows or lines
M = the number of columns or pixels
B = the number of bits necessary to store the largest possible pixel value.

Typical values for N, M and B in medical imaging are 512, 512 and 8 respectively; thus, each matrix comprises 2,097,152 bits. However, special applications need larger images and matrices of 33,554,152 bits have been used. For many applications a plurality of images are required per study. The relatively large size of the matrices presents severe restrictions. Presently available imaging systems either have very large on line memory capacity or the capability of storing the matrix data on an external medium (magnetic disk, for example) at a fast rate, or both.

In many imaging systems it is very important to maximize the acquisition rate. This is especially important in systems using scanning means to form the image such as for example digital X-Ray fluorography systems using TV cameras in the acquisition equipment. The usual, commercially available video cameras are limited to process data at rates up to a few megahertz (approximately 4). The scanning rate of such video cameras is synchronized with the commercially available power so that the eye will perceive smooth transitions between individual, differing images (cine mode display). Thus 50 or 60 scans per second are accomplished. A single scan therefore obviously cannot read out a 512×512 matrix which is the preferred size matrix with currently achievable field size and spatial resolution. In conventional prior art systems this inability to completely scan the stored data in a single scan is overcome by scanning each image in two passes. This is normally accomplished in either of the following ways:

(a) The interlace method where one pass scans the even lines, for example, and another pass scans the odd lines; and (b) The progressive method where the first pass scans lines 1–256 and the next pass scans lines 257–512. Both methods use two passes ("fields") per image. Thus both are limited to 25 or 30 images per second. These acquisition rates impose limitations on the entire system. For example, a transfer of data to external storage means proceeds at a much slower rate. Images acquired at the full rate cannot be immediately stored.

Internal memories are relatively fast but expensive; external memories are relatively inexpensive but slow. Some presently available systems use combinations of the two types of memories using an internal memory as a "buffer", for fast storage which is subsequently "dumped" at a slower rate to an external memory. This arrangement frees the system from the constraint of the slow transfer rate for studies which are sufficiently short (the number of images is small enough) so as not to "overflow" the buffer memory. The "fast" study length is still restricted in such systems because of price considerations. An optimal system is described in the co-pending U.S. patent application entitled "Buffer Memory System", Ser. No. 487.312 filed on Apr. 21, 1983 and assigned to the assignee of this invention. Therein the dumping is done simultaneously with the acquisition.

Accordingly, scientists using imaging systems which, for example, require plurality of time separated images, are in need of means and methods for improving the imaging systems by increasing the efficiency of the image storage or memory portions of the imaging systems and also the possibility of increasing the image acquisition rate. In addition, the means and method to be described increases the "fast study" length.

BRIEF DESCRIPTION OF THE INVENTION

According to a preferred aspect of the invention an improved imaging system is provided, said system acquiring images for diagnostic purposes and storing the images in matrices comprising N lines of M pixels, where each pixel has a digital value between 0 to $(2^B - 1)$ said method comprising the steps of:

acquiring an image comprising N lines of M pixels each, with pixel having a value ranging over 0−B digits: and storing every second line of said acquired image.

The inventive method features interpolating between the stored every second line to reconstruct the missing non-stored lines.

The inventive method also results in increasing the rate of transfer of image data into the long term stores by a factor of at least two.

A further synergistic advantage obtained by the method described is a doubling the capacity of both the short term and the long term memories, thereby enabling longer studies, and the long term storage of more studies.

A preferred embodiment of the invention also makes use of the fact that only every second line is stored, to substantially decrease the necessary storage capacity. Thus, for example, where conventional imaging systems use 512×512 images, a system such as described herein acquires and stores images with 256 lines of 512 pixels. The images are expanded to the 512×512 size only during the display stage.

A preferred aspect of the imaging system makes use of the fact that only every other line is stored by acquiring only the lines that are to be stored.

A synergistic result of the described preferred aspect of the imaging system is that the acquisition time is significantly decreased, thereby enabling acquisition at faster rates, i.e. 50 or 60 images per second.

Another synergistic result is a significant increase in the "fast study" length, which is an outcome of the increases in both the transfer rate to the external memory and the capacity of the internal memory.

While the method is described herein in conjunction with a digital fluoroscopy system it is applicable to other medical diagnostic imaging systems such as gamma camera systems where the time required for the peak count in each pixel to be reached can be decreased by a factor of 2.

BRIEF DESCRIPTION OF THE DRAWINGS

The above mentioned and other features and objects of the superinterlacing type imaging systems will be best understood in the light of the following description made in conjunction with the accompanying drawings, wherein:

FIG. 2 is a schematic block diagram showing of a matrix read-out system that can be used to implement the improved imaging method described herein.

GENERAL DESCRIPTION

Figure 1:
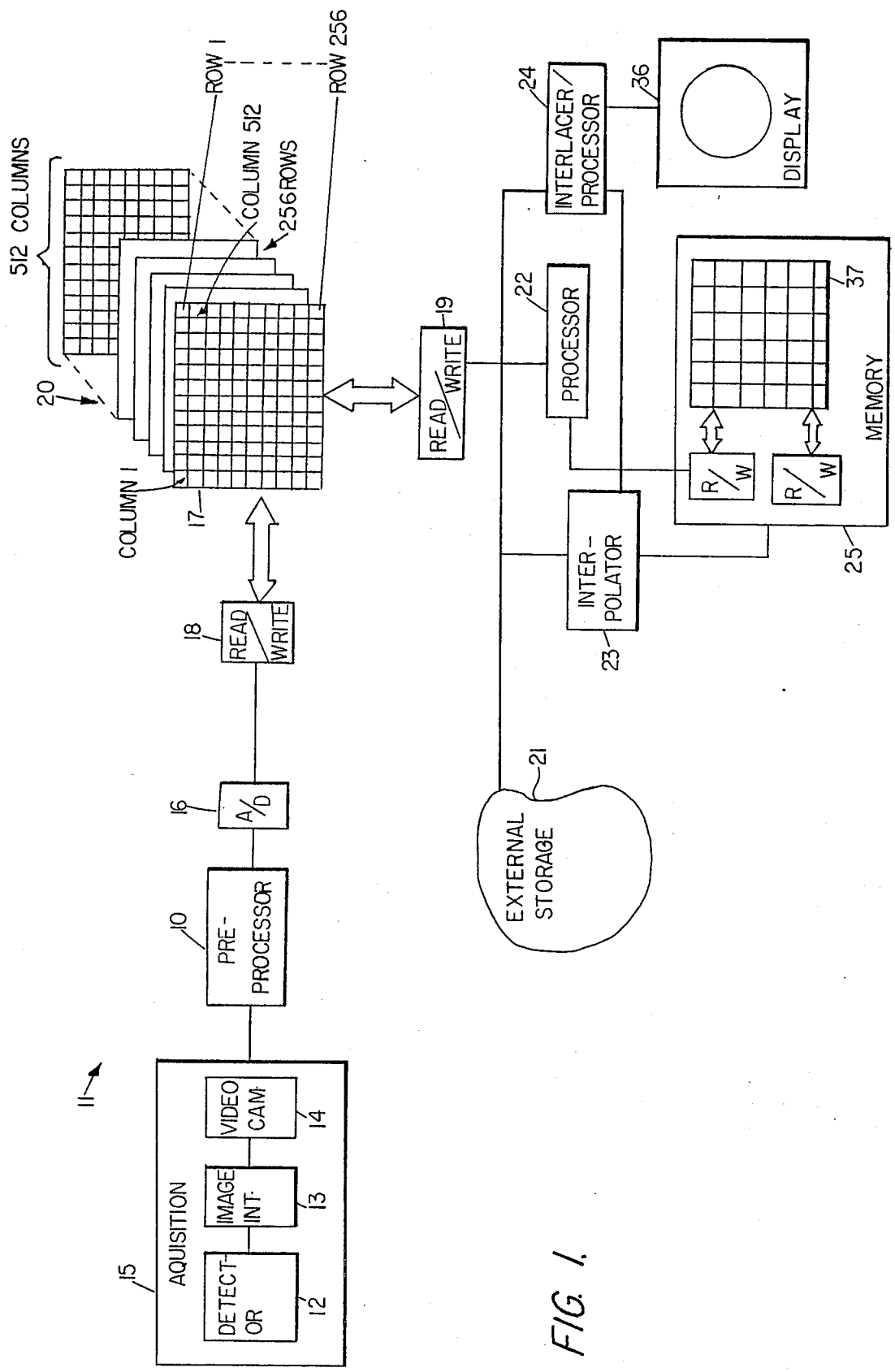
FIG. 1 is a block diagram showing an example of an imaging system.

The imaging system 11 of FIG. 1 includes detector apparatus 12 such as used in digital fluorography, e.g., an X-Ray detector and X-Ray convertor apparatus for converting the radiation transmitted through the object to a pattern of electrical charges representative of the radiation attenuatiion. The pattern is directed to appear on the image intensifier unit 13.

The face of the intensifier can be viewed as being divided into picture elements or pixels, each having a determinable brightness or intensity value determined by the pattern.

The video camera unit 14 reacts to the variations in brightness as it scans the face of the image intensifier. The output of camera 14 are well known analog video signals that have amplitude variations responsive to the variations in intensity of each pixel along each scan line.

The analog video signals may be processed by preprocessor 10 (e.g. a log amplifier) and are digitized by the analog to digital convertor 16. The digital output is placed into the matrix store 17 by the read-write unit 18. From there it may be read again by read-write unit 19 in order to be transferred to the external storage 21.

The data from the 256 line first scan of the camera 14 is stored in 256 rows of the matrix 17 in a manner similar to that used by present prior art equipment. The equipment is illustratively depicted as operating with read-write circuits 18 for placing the digital camera data in the appropriate rows of matrix 17 of the depicted 512×256 matrices 20. The prior art equipment places the data in 256 lines of the 512 line matrix. After two scans, in prior art devices, data is placed in every row of a 512×512 matrix. In both cases the matrices are representative of the images and matrix locations are identified with pixels. The display monitor 36 usually operates at the same scan rate and data handling rate as a TV camera. Thus, the display of a 512×512 matrix is done either interlaced or progressive modes, usually interlaced: One displayed "field" shows the even lines, the other the odd lines.

In the proposed invention the second acquisition scan is not done. Therefore in FIG. 1 the matrices 20 are shown as 512×256 matrices. For display purposes, the missing lines are derived from the stored data. Therefore means such as interpolator 23 are provided for producing, during the display mode, data for the unstored lines.

When the information is recalled from storage for display, it is simplest to first display a "field" of the stored lines, then display a "field" of interpolated lines. The interpolated "field" may be interlaced between the lines of the first field by interlacing unit 24. For progressive mode displays the interpolated field is placed in the correct half of the screen by the "progressor" unit 24. A special 'display memory' 25 allows storage of both matrices for image refreshing purposes. The data from either the storage matrices 20 or a display memory 25 may be used for further processing in unit 22.

A similar mechanism applies to digital displays, where the interlacing has also to be performed by the processor. In acquisition systems where there is no control over the source radiation, such as in gamma cameras, pairs of lines may be summed together: thus, reducing the number of lines and with it the acquisition time required for the same count per pixel level by one-half.

The system of FIG. 2 depicts examples of details in block diagram form of some aspects of the present invention. More particularly the matrices 20 of data received from the acquisition portion 15 of system 11 includes the matrix 17. During the display stage of the operation, the circuit 19 reads out the storage matrices 20.

Means are provided for interpolating lines of data from the previously acquired and stored data. For example, as shown in FIG. 2, the original stored data in the matrices such as matrix 17 is read out and put on every other line of pixels in matrix 26 by the processing circuit 22. The data is transferred from circuit 19 over lines 28 and 29 respectively. Line 29 transfers the data for connection to circuit 22. The data is also transferred though line 28 to shift circuit 32 which shifts the data one line (up or down). The shifted data is then added to the original data by ADD circuit 33. The added or summed data is divided by 2 in circuit 34. This is the interpolated data (in this example, linearly interpolated) which is transferred to processing circuit 22 for combining with the original data to provide a 512×512 matrix 26. The data of matrix 26 is used for the display image on monitor 36. A matrix store 37 may be used to maintain the interpolated data if desired. Alternative methods for interpolation abound, e.g. using an array processor to shift the image one line up (or down), sum the original and shifted images and divide the result by 2 to produce the interpolated field.

A benefit of the described method not discernible from the Figures concerns systems with simultaneous acquisition and transfer to an external memory. Therein the transfer rate of data to the external memory storage is doubled. More particularly note that when the transfer rate to storage is Rs bits/second or Rs/S images/second and the acquisition rate is Ra/S images per second, the length of study time is limited in such systems only by the external memory as long as Ra<Rs. This is an advantage because for reasons of cost external memories are much larger than internal ones. If Ra>Rs the internal memory (buffer) will be filled at a rate (Ra−Rs)/S. If the total internal memory (buffer) is M images large, acquisition can extend for a time T, where:

T=MS/(Ra-Rs) seconds or for
T=MRa/(Ra-Rs) images.

In the present invention the transfer rate is doubled, and is therefore 2Rs. If the same acquisition rate is used, the length of study time is limited by the external memory for rates up to Ra=2Rs images/seconds (twice the prior-art rate). When Ra>2Rs then the internal memory is 2M images large; the limiting study length is then $$T = 2MRa/(Ra - 2Rs) \text{ images}$$

which is at least twice more than the conventional length T and sometimes much more. For example if Ra=3Rs the limit rises from 1.5M to 6M or by a factor of four.

As alluded to previously, in order to obtain 512×512 images using ordinary TV cameras two sweeps are necessary, i.e. 256 lines of 512 pixels each. Such sweeps are either done in interlaced or progressive modes. In the interlaced mode the first sweep scans the odd (or even) numbered lines, while in the second sweep all of the even (or odd) numbered lines are scanned. The progressive mode contemplates scanning the top 256 lines in the first sweep and the second sweep scans the bottom 256 lines. Because of local power source frequencies this results in the acquisition of either 25 or 30 images per second or one sweep of one half of an image per cycle of line frequency. Using the improved system described herein only 256 lines are needed; therefore, up to 50 or 60 images per second can be acquired, or a full image per cycle of line frequency.

An additional advantage is the higher flexibility in acquisition rates. If the highest acquisition rate is denoted by Rm (=25 or 30 for normal TV cameras), then in the past the acquisition could proceeded in the following rates: Rm, Rm/2, Rm/3, Rm/4 . . . . The present proposal not only enables 2Rm, but also the whole series 2Rm/5, 2Rm/7 . . . , thus the rate possible with the described system are: Ra=2Rm, Rm ⅔Rm, ½Rm, 2/5Rm, ⅓Rm, 2/7R, ¼Rm . . . .

The price paid is a slight loss of resolution in the direction across the lines. The loss of resolution is not as serious as it might seem at first sight. Information is really lost only if it originally was:
(a) Along a line that is not scanned.
(b) Thin enough to not appear on adjacent lines.
Otherwise, if Ry is the resolution across the lines, dy is the distance between the lines, and Rx the resolution along the lines, then typically Rx and Ry>dy. The average resolution is then:

$$R = \sqrt{Rx^2 + Ry^2}.$$

Using the proposed method changes dy to 2dy, Ry to essentially M=max (Ry, 2dy) (the larger of Ry and 2dy) and the average resolution to:

$$R = \sqrt{Rx^2 + M^2}.$$

Thus, even in the extreme case where Ry=dy, the average loss of resolution is of 58%. If on the other hand, Rx=Ry=1.5dy, the average loss of resolution is only 17%. The TV scan has a width for each line in interlaced mode that is greater than the distance between the lines. This makes Ry>dy and assures that the resolution is only minimally affected compared to the interlaced mode. What is more, because of this width, the second sweep collects less photons than the first, causing a change in brightness that appears as an image flicker in prior-art interlaced systems. This flicker is inherently not present in the proposed method.

In summation: Compared to the interlaced mode, the proposed method has many advantages as noted hereinabove; compared to the progressive mode, the several advantages cost a slight loss of resolution in the direction across the scan lines.

It should be noted that while the overall description was made with reference to images acquired by video techniques nonetheless the invention is applicable to other image acquisition modes as indicated by the block 15 shown encompassing equipment 12, 13 and 14 in FIG. 1.

While the invention has been described with reference to certain embodiments, it should be understood that the description is made by way of example and not as a limitation on the scope of the invention.

What is claimed is:

1. An imaging system for medical diagnostic purposes, said system comprising:
   (a) means for acquiring data for constructing images having n lines of m pixels, wherein the distance between each of the n lines is smaller than the resolution of the image in the same direction;
   (b) means for selecting the acquired data along lines having a larger space therebetween than the space between n lines of the image, whereby substantially n/2 lines of data are selected;
   (c) means for storing the substantially n/2 lines of data in memory means; and
   (d) means for operating on the selected stored lines to obtain the n lines of the m pixels for the image.

2. An imaging system for medical diagnostic purposes, said system comprising:
   (a) means for acquiring data for constructing images having n lines of m pixels, wherein the distance between each of the n lines is smaller than the resolution of image in the same direction;
   (b) means for selecting the acquired data along lines having a larger space therebetween than the space between the n lines of the image, whereby n/x lines of data are selected where x is greater than one;
   (c) said means for selecting comprising means for acquiring alternate ones of said n lines;
   (d) means for storing the n/x lines of data in memory means; and
   (e) means for operating on the selected stored lines to obtain the n lines of the m pixels for the image.

3. An improved method of imaging for medical diagnostic purposes, said method comprising the steps of:

(a) acquiring data for constructing images having n lines of m pixels; wherein the distance between the n lines is smaller than the resolution of the image in the same direction, (b) selecting the acquired data along lines having a larger space therebetween then the space between the n lines of the image; whereby, n/x lines of data are selected, where x is greater than 1;

(c) storing the selected n/x lines in memory means; and (d) operating on the selected stored lines to obtain the n lines of m pixels for the image.

4. The imaging method of claim 3 wherein the step of selecting comprises scanning according to TV interlaced raster scan procedures with a scan spot larger than the pitch of the scan lines.

5. The method of claim 3 wherein said n lines comprises parallel lines.

6. The method of claim 3 wherein the step of selecting comprises selecting n/2 lines of the acquired data.

7. The method of claim 3 wherein said data is arranged in n lines, and wherein the step of selecting comprises selecting alternate lines of said n lines.

8. The method of claim 3 wherein the step of operating includes interpolating.

9. The method of claim 3 wherein the step of acquiring comprises video scanning to acquire the said lines of data.

10. The method of claim 9 wherein the step of scanning comprises scanning in an interlaced mode to obtain said n/x lines of data.

11. The method of claim 3 wherein the step of selecting is accomplished by acquiring only desired lines of said n lines of data.

12. The method of claim 11 wherein the step of acquiring comprises acquiring n/2 lines of said n lines of data.

13. The method of claim 11 wherein the step of acquiring comprises acquiring alternate lines of the lines of data to be used in generating the image.

14. The method of claim 3 wherein the step of operating includes arranging the m pixels of the lines of m pixels in columns and obtaining weighted averages in the same columns.

15. The method of claim 14 wherein the step of obtaining the weighted averages includes:

weighting the data in one of two successive selected lines by multiplying the value stored in every column of the said one line by a constant selected factor, weighting the data in the other of the two successive selected lines by multiplying the values stored in every column of the said other line by a complementary factor that complements the constant selected factor to one, adding the products per aligned columns to obtain data to be used in place of the unselected line of data between the two successive selected lines.

16. The method of claim 14 wherein the step of obtaining the weighted averages comprises:

multiplying the values in the columns of the two adjacent acquired lines of data by one half and adding the products.

17. An imaging system for medical diagnostic purposes, said system comprising:

(a) means for acquiring data for constructing images having n lines of m pixels, wherein the distance between each of the n lines is smaller than the resolution of the image in the same direction;

(b) means for selecting the acquired data along lines having a larger space therebetween than the space between the n lines of the image, whereby n/x lines of data are selected where x is greater than 1;

(c) means for storing the n/x lines of data in memory means; and (d) means for operating on the selected stored lines to obtain the n lines of m pixels for the image.

18. The system of claim 17 wherein the means for selecting comprises means for acquiring only data from certain of said scans.

19. The system of claim 17 wherein the means for selecting comprises means for acquiring only the lines of data in one of the two sets.

20. The system of claim 17 wherein the means for operating includes interpolating.

21. The imaging system of claim 17 wherein said means for acquiring digital data comprises TV raster scanning means wherein the width of each scanning spot is larger than the pitch of the scan lines.

22. The system of claim 17 wherein said plurality of lines comprises parallel lines.

23. The system of claim 17 wherein the means for acquiring comprises video scanning means to acquire the said lines of data.

24. The system of claim 23 wherein the video scanning means comprises means for scanning in an interlaced mode to obtain two sets of the lines of data.

25. The system of claim 17 wherein the means for selecting comprises means for acquiring only n/x of said n lines of data.

26. The system of claim 25 wherein the means for acquiring comprises means for acquiring n/2 lines of data to be used in generating the image.

27. The system of claim 25 wherein the means for acquiring comprises means for acquiring alternate lines of the lines of data to be used in generating the image.

28. The system of claim 17 wherein the means for operating includes means for arranging the data of the lines of data in columns and means for obtaining weighted averages in the same columns.

29. The system of claim 28 wherein the means for obtaining the weighted averages include:

means for weighting the data in one of two successive selected lines using means for multiplying the value stored in every column of the said one line by a constant selected factor, means for weighting the data in the other of the two successive selected lines comprising means for multiplying the value stored in every column of the said other line by a complementary factor that complements the selected factor to one, and means for adding the products per aligned columns to obtain data to be used in place of the unselected line of data between the two successive selected lines.

30. The system of claim 28 wherein the means for obtaining the weighted averages comprises:

means for multiplying the values of the columns of the two adjacent acquired lines of data by one half, and means for adding the products.

* * * * *